US012272869B2

(12) United States Patent
Kim et al.

(10) Patent No.: US 12,272,869 B2
(45) Date of Patent: Apr. 8, 2025

(54) ANTENNA STRUCTURE

(71) Applicant: DONGWOO FINE-CHEM CO., LTD., Jeollabuk-do (KR)

(72) Inventors: Young Ju Kim, Gyeonggi-do (KR); Yoon Ho Huh, Seoul (KR); Hee Jun Park, Gyeonggi-do (KR); Young Su Lee, Gyeonggi-do (KR); In Kak Song, Daejeon (KR); Dong Pil Park, Incheon (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 150 days.

(21) Appl. No.: 17/848,888

(22) Filed: Jun. 24, 2022

(65) Prior Publication Data

US 2022/0416410 A1 Dec. 29, 2022

(30) Foreign Application Priority Data

Jun. 25, 2021 (KR) ........................ 10-2021-0083376
Jul. 22, 2021 (KR) ........................ 10-2021-0096303

(51) Int. Cl.
*H01Q 1/38* (2006.01)
*H01Q 1/22* (2006.01)
*H01Q 1/42* (2006.01)

(52) U.S. Cl.
CPC ........... *H01Q 1/422* (2013.01); *H01Q 1/2283* (2013.01); *H01Q 1/38* (2013.01)

(58) Field of Classification Search
CPC ............. H01Q 1/38; H01Q 1/241-243; H01Q 9/0407; H01Q 21/065
See application file for complete search history.

(56) References Cited

U.S. PATENT DOCUMENTS

| | | | | |
|---|---|---|---|---|
| 7,079,079 | B2 * | 7/2006 | Jo | H01Q 9/0442 343/702 |
| 7,675,466 | B2 * | 3/2010 | Gaucher | H01Q 21/062 343/905 |
| 10,833,418 | B2 * | 11/2020 | Cheng | H01Q 1/243 |
| 10,957,981 | B2 * | 3/2021 | Yoshitake | H01Q 9/0407 |
| 11,532,894 | B2 * | 12/2022 | Kim | H01Q 21/0006 |
| 2019/0067834 | A1 * | 2/2019 | Park | H01Q 5/385 |
| 2020/0403300 | A1 * | 12/2020 | Kim | H01Q 9/0407 |

FOREIGN PATENT DOCUMENTS

| | | | |
|---|---|---|---|
| KR | 10-1411444 | B1 | 7/2014 |
| KR | 10-1622201 | B1 | 5/2016 |
| KR | 10-2019-0009232 | A | 1/2019 |
| KR | 10-2201989 | B1 | 1/2021 |

* cited by examiner

*Primary Examiner* — Hasan Islam
(74) *Attorney, Agent, or Firm* — The PL Law Group, PLLC

(57) ABSTRACT

An antenna structure according to an embodiment of the present invention includes a first antenna unit including a first radiator, a first transmission line connected to the first radiator, and a guide pattern disposed around the first transmission line and separated from the first transmission line, a second antenna unit at least partially covered by the guide pattern of the first antenna unit in a plan view, and a dielectric layer interposed between the first antenna unit and the second antenna unit. An antenna structure implementing low-frequency and high-frequency properties with high reliability is provided.

13 Claims, 7 Drawing Sheets

ANTENNA STRUCTURE

CROSS-REFERENCE TO RELATED APPLICATION AND CLAIM OF PRIORITY

This application claims the benefit under 35 USC § 119 of Korean Patent Applications Nos. 10-2021-0083376 filed on Jun. 25, 2021, and 10-2021-0096303 filed on Jul. 22, 2021, in the Korean Intellectual Property Office, the entire disclosures of which are incorporated by reference herein.

BACKGROUND

1. Field

The present invention relates to an antenna structure. More particularly, the present invention relates to an antenna structure including antenna units of different frequency bands.

2. Description of the Related Art

As information technologies have been developed, a wireless communication technology such as Wi-Fi, Bluetooth, etc., is combined with an image display device, an electronic device, an architecture, etc.

Further, as mobile communication technologies have been rapidly developed, an antenna capable of operating a high frequency or ultra-high frequency communication is applied to various mobile devices.

In a mobile communication in the high frequency or ultra-high frequency band, a signal loss may easily occur as a length of a wavelength is decreased. Accordingly, an antenna structure serving as a relay antenna, an auxiliary antenna, etc., may be applied to an architecture, a decorative structure, a vehicle, or the like.

However, when a high-frequency or ultrahigh-frequency band antenna is disposed to be adjacent to a conventional low-frequency antenna, radiation and impedance properties of different antennas may be collided and disturbed.

Additionally, when disposing different antennas to be separated from each other, a space for disposing the antenna becomes increased to degrade spatial efficiency and aesthetic characteristics of an object or a structure.

SUMMARY

According to an aspect of the present invention, there is provided an antenna structure having improved radiation and spatial efficiency.

The above aspects of the present inventive concepts may be achieved by the following embodiments:

(1) An antenna structure, including: a first antenna unit including a first radiator, a first transmission line connected to the first radiator, and a guide pattern disposed around the first transmission line and separated from the first transmission line; a second antenna unit at least partially covered by the guide pattern of the first antenna unit in a plan view; and a dielectric layer interposed between the first antenna unit and the second antenna unit.

(2) The antenna structure of the above (1), wherein a resonance frequency of the second antenna unit is greater than a resonance frequency of the first antenna unit.

(3) The antenna structure of the above (1), wherein the second antenna unit includes a second radiator and a second transmission line connected to the second radiator.

(4) The antenna structure of the above (3), wherein an area of the second radiator is smaller than an area of the first radiator.

(5) The antenna structure of the above (3), wherein the second radiator is entirely covered by the guide pattern in the plan view.

(6) The antenna structure of the above (5), wherein a plurality of the second antenna units are covered by the guide pattern in the plan view.

(7) The antenna structure of the above (1), wherein the guide pattern includes a first guide pattern and a second guide pattern separated from each other with the first transmission line interposed therebetween.

(8) The antenna structure of the above (7), further including a third antenna unit, wherein the second antenna unit is superimposed over the first guide pattern in the plan view, and the third antenna unit is superimposed over the second guide pattern in the plan view.

(9) The antenna structure of the above (8), wherein a resonance frequency of the third antenna unit is greater than a resonance frequency of the second antenna unit, and the resonance frequency of the second antenna unit is greater than a resonance frequency of the first antenna unit.

(10) The antenna structure of the above (9), wherein the third antenna unit includes a third radiator and a third transmission line connected to the third radiator.

(11) The antenna structure of the above (10), wherein the third radiator is entirely covered by the second guide pattern in the plan view.

(12) The antenna structure of the above (11), wherein a plurality of the third antenna units are covered by the second guide pattern in the plan view.

(13) The antenna structure of the above (9), wherein the resonance frequency of the first antenna unit is 10 GHz or less, and the resonance frequencies of the second antenna unit and the third antenna unit is from 20 GHz to 40 GHz.

(14) The antenna structure of the above (1), wherein the dielectric layer includes a first dielectric layer and a second dielectric layer spaced apart from each other, and the first antenna unit is disposed on the first dielectric layer, and the second antenna unit is disposed on the second dielectric layer.

(15) The antenna structure of the above (1), wherein the first antenna unit further includes an intermediate pattern disposed between the first radiator and the first transmission line, and a width of the intermediate pattern increases stepwise or gradually in a direction from the first transmission line to the first radiator.

(16) The antenna structure of the above (1), further including: an antenna cable coupled to the first transmission line; and a first antenna driving integrated circuit chip electrically connected to the first antenna unit through the antenna cable.

(17) The antenna structure of the above (1), further including: a circuit board bonded on the second antenna unit; and a second antenna driving integrated circuit chip electrically connected to the second antenna unit through the circuit board.

In an antenna structure according to embodiments of the present invention, a low-frequency antenna unit and a high-frequency antenna unit may be included or integrated together in one structure. Accordingly, a single antenna structure in which a low frequency property and a high or ultrahigh frequency property are implemented together may be provided.

In exemplary embodiments, the high-frequency antenna unit may overlap a guide pattern of the low frequency antenna unit in a thickness direction. The guide pattern may serve as a ground layer of the high-frequency antenna unit, and a directivity of the high-frequency antenna unit may be improved by the guide pattern.

Accordingly, a low frequency/omnidirectional coverage antenna radiation and high frequency/directional antenna radiation may be effectively implemented in a single structure.

DETAILED DESCRIPTION OF THE EMBODIMENTS

According to exemplary embodiments of the present invention, there is provided an antenna structure in which antenna units of different resonance frequencies are combined.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
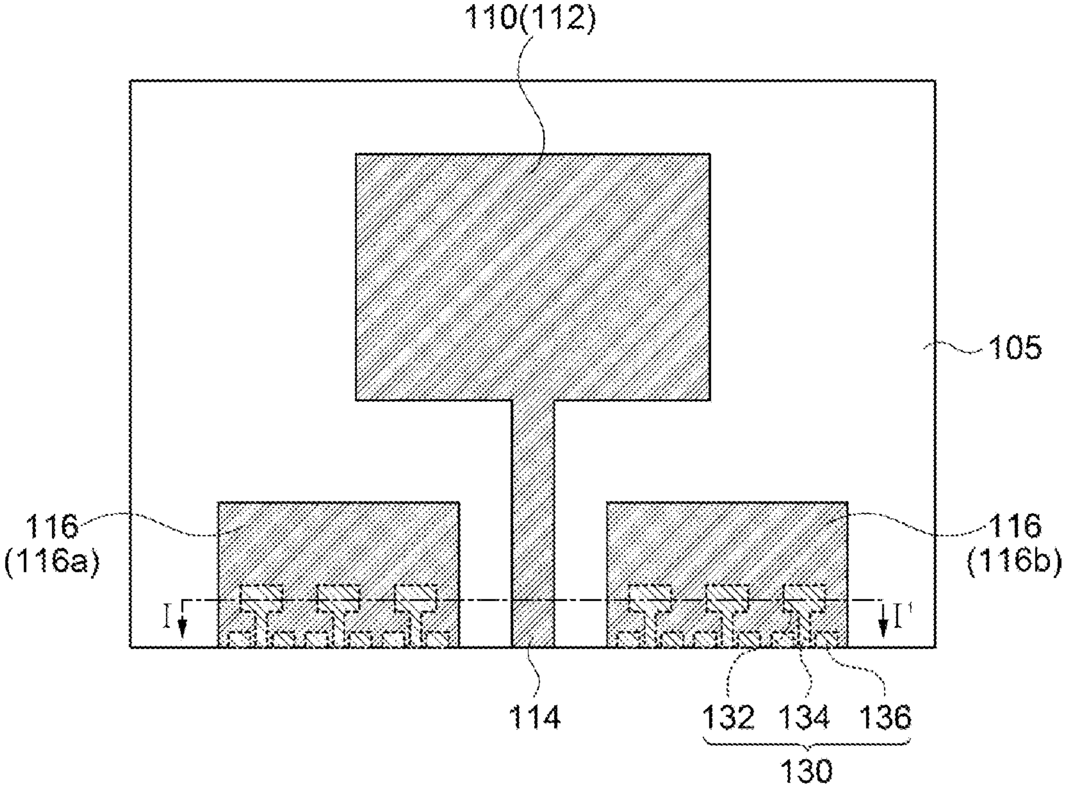
FIG. 1 is a schematic top plan view illustrating an antenna structure in accordance with exemplary embodiments.
Figure 2:
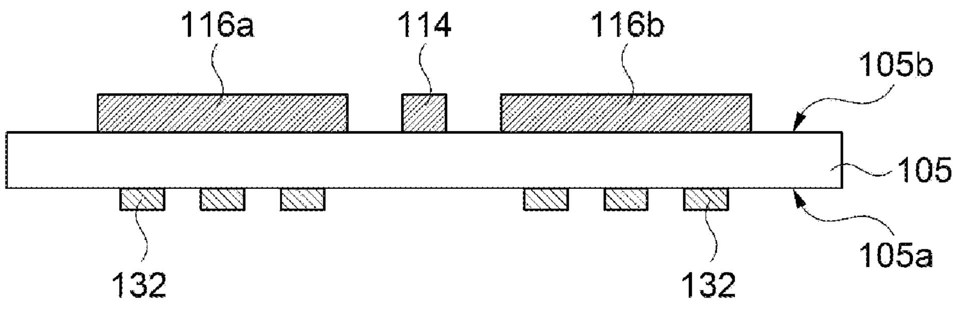
FIG. 2 is a schematic cross-sectional view illustrating an antenna structure in accordance with exemplary embodiments.

FIG. 1 is a schematic top plan view illustrating an antenna structure in accordance with exemplary embodiments. FIG. 2 is a schematic cross-sectional view illustrating an antenna structure in accordance with exemplary embodiments. For example, FIG. 2 is a cross-sectional view taken along a line I-I' of FIG. 1 in a thickness direction.

Referring to FIG. 1, the antenna structure may include a dielectric layer 105, a first antenna unit 110 and a second antenna unit 130.

The dielectric layer 105 may include, e.g., a transparent resin material. For example, the dielectric layer 105 may include a polyester-based resin such as polyethylene terephthalate, polyethylene isophthalate, polyethylene naphthalate, polybutylene terephthalate, etc.; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

In some embodiments, an adhesive film such as an optically clear adhesive (OCA), an optically clear resin (OCR), or the like may be included in the dielectric layer 105.

In some embodiments, the dielectric layer 105 may include an inorganic insulating material such as silicon oxide, silicon nitride, silicon oxynitride, glass, etc.

In an embodiment, the dielectric layer 105 may be provided as a substantially single layer. In an embodiment, the dielectric layer 105 may include a multi-layered structure of two or more layers.

Impedance or inductance for the antenna units 110 and 130 may be formed by the dielectric layer 105, so that a frequency band at which the antenna structure may be driven or operated may be adjusted. In some embodiments, a dielectric constant of the dielectric layer 105 may be adjusted in a range from about 1.5 to about 12. When the dielectric constant exceeds about 12, a driving frequency may be excessively decreased and driving in a desired high/ultra-high frequency band may not be implemented.

The first antenna unit 110 and the second antenna unit 130 may be disposed on different surfaces of the dielectric layer 105. As illustrated in FIG. 2, the dielectric layer 105 may include a first surface 105*a* and a second surface 105*b* opposite to each other. For example, the first antenna unit 110 may be disposed on the first surface 105*a* of the dielectric layer 105, and the second antenna unit 130 may be disposed on the second surface 105*b* of the dielectric layer 105.

The terms "the first surface 105*a* and the second surface 105*b*" are used herein to refer to other surfaces facing each other, and are not intended to designate an absolute position. In an embodiment, the first antenna unit 110 may be disposed on a top surface of the dielectric layer 105, and the second antenna unit 130 may be disposed on a bottom surface of the dielectric layer 105. In an embodiment, the first antenna unit 110 may be disposed on the bottom surface of the dielectric layer 105, and the second antenna unit 130 may be disposed on the top surface of the dielectric layer 105.

The first antenna unit 110 may serve as a low-frequency antenna unit. For example, the first antenna unit 110 may serve as an antenna unit in a band of 10 GHz or less, or 6 GHz or less.

In an embodiment, the first antenna unit 110 may include an antenna corresponding to a Long Term Evolution (LTE) band and a Wi-Fi band. In an embodiment, the first antenna unit 110 may serve as a monopole antenna.

The first antenna unit 110 may include a first radiator 112, a first transmission line 114 and a guide pattern 116. The first radiator 112 may serve as an omnidirectional radiator that may provide monopole properties as described above, and may have substantially no directivity in a specific direction.

As illustrated in FIG. 1, the first radiator 112 may be formed in a rectangular pattern, but the shape of the first radiator 112 may be appropriately changed according to an object or structure to which the antenna structure is applied.

The first transmission line 114 may extend from one side of the first radiator 112. For example, the first transmission line 114 may be formed as a member substantially integral with the first radiator 112.

The guide pattern 116 may be disposed around the first transmission line 114 to be physically and electrically separated from the first transmission line 114 and the first radiator 112. The guide pattern 116 may promote a transmission of power and signal from the first transmission line 114 to the first radiator 112. For example, the guide pattern 116 may serve as a coplanar waveguide (CPW) pattern.

For example, a pair of the guide patterns 116 may face each other with the first transmission line 114 interposed therebetween, and may extend in the same direction as that of the first transmission line 114. In exemplary embodiments, the guide pattern 116 may include a first guide pattern 116*a* and a second guide pattern 116*b*. The first guide pattern 116*a* and the second guide pattern 116*b* may be separated from each other with the first transmission line 114 interposed therebetween.

A width of each guide pattern 116 may be greater than a width of the first transmission line 114. The first radiator 112, the first transmission line 114 and the guide pattern 116 may be disposed at the same layer or at the same level.

The second antenna unit 130 may overlap the first antenna unit 110 in a thickness direction with the dielectric layer 105 interposed therebetween. In exemplary embodiments, as illustrated in FIG. 1, the second antenna unit 130 may be entirely covered by the guide pattern 116 when projected in a planar view.

The second antenna unit 130 may serve as a high-frequency or ultrahigh-frequency antenna unit. For example, the second antenna unit 130 may serve as an antenna unit in a band of 20 GHz or higher or 25 GHz or higher.

In an embodiment, the second antenna unit 130 may serve as an antenna having a directivity in a specific direction. For example, the second antenna unit 130 may serve as a vertical radiation antenna.

The second antenna unit 130 may include a second radiator 132, a second transmission line 134 and a second ground pad 136. The second radiator 132 may have, e.g., a polygonal plate shape, and the second transmission line 134 may extend from one side of the second radiator 132. The second transmission line 134 may be connected to the second radiator 132 as a substantially integral member.

The second ground pad 136 may be disposed around the second transmission line 134 to be physically and electrically separated from the second transmission line 134 and the second radiator 132. For example, a pair of the second ground pads 136 may be disposed to be separated with the second transmission line 134 interposed therebetween.

The second radiator 132, the second transmission line 134 and the second ground pad 136 may be disposed at the same layer or at the same level.

The second ground pad 136 may absorb or shield a noise around the second transmission line 134. In an embodiment, the second ground pad 136 may serve as a bonding pad for an adhesion with to the circuit board 160 and 170 (see FIG. 7).

In some embodiments, a second signal pad (not illustrated) for connecting an external circuit may be connected to an end portion of the second transmission line 134. In an embodiment, the end portion of the second transmission line 134 may serve as the second signal pad.

In exemplary embodiments, the second antenna unit 130 may have a smaller size (area) than that of the first radiator 112 of the first antenna unit 110, and may have a smaller size than that of the guide pattern 116.

Accordingly, as described above, the second antenna unit 130 may be entirely covered by the guide pattern 116 in a plan view.

In some embodiments, the second antenna unit 130 may be partially covered by the guide pattern 116, and the second radiator 132 may be entirely covered by the guide pattern 116.

The guide pattern 116 may serve as a ground layer of the second antenna unit 130. Accordingly, noise and interference signals around the second transmission line 134 and the second radiator 132 may be absorbed or shielded by the guide pattern 116.

Additionally, the directivity of the second antenna unit 130 or the second radiator 132 may be enhanced by the guide pattern 116, so that the second antenna unit 130 may serve as a substantially vertical radiation antenna.

As illustrated in FIG. 1, the guide pattern 116 may cover a plurality of the second antenna units 130 in the plan view. For example, each of the first guide pattern 116*a* and the second guide pattern 116*b* may cover the plurality of the second antenna units 130.

Accordingly, the guide pattern 116 may serve as a common ground layer for the plurality of the second antenna units 130, and the second antenna units 130 may be provided in an array form, so that a sufficient amount of gain in the high frequency/ultra-high frequency band may be obtained.

In FIG. 1, three second antenna units 130 are illustrated to correspond to one guide pattern 116, but the number of the second antenna units 130 may be appropriately changed according to the frequency band and the size of the second antenna unit 130. For example, four or more second antenna units 130 may correspond to one guide pattern 116.

The antenna units 110 and 130 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination thereof.

In an embodiment, the antenna units 110 and 130 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna units 110 and 130 may include a transparent conductive oxide such indium tin oxide (ITO), indium zinc oxide (IZO), zinc oxide (ZnOx), indium zinc tin oxide (IZTO), etc.

In some embodiments, the antenna units 110 and 130 may include a stacked structure of a transparent conductive oxide layer and a metal layer. For example, the antenna units 110 and 130 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In an embodiment, the antenna units 110 and 130 may include a metamaterial.

According to the above-described exemplary embodiments, the high-frequency/ultra-high-frequency antenna unit may be integrated together in a single structure by utilizing the guide pattern of the monopole-type low-frequency antenna unit. Thus, an overall spatial efficiency of the antenna structure may be improved.

Additionally, the directivity of the high-frequency/ultra-high-frequency antenna unit may be achieved while maintaining a wide coverage property of the low-frequency antenna unit. Thus, a sufficient gain may be obtained by the second antenna units 130 provided in the array form while suppressing a signal loss corresponding to the high frequency/ultrahigh frequency antenna unit.

Figure 3:
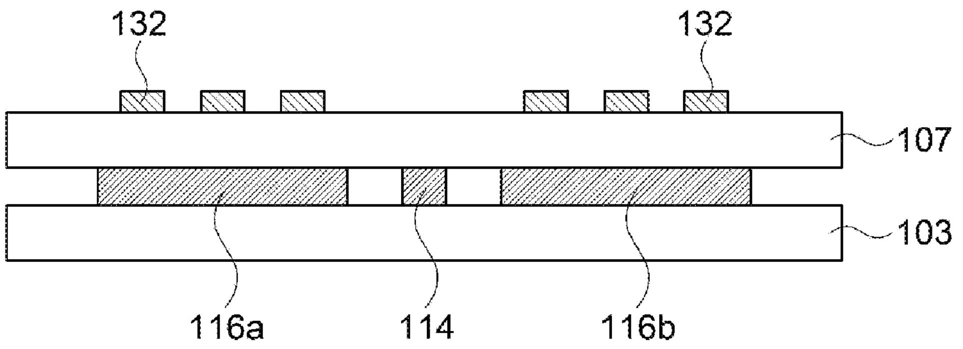
FIG. 3 is a schematic cross-sectional view illustrating an antenna structure in accordance with some exemplary embodiments.

FIG. 3 is a schematic cross-sectional view illustrating an antenna structure in accordance with some exemplary embodiments. Detailed descriptions of elements and structures substantially the same as or similar to those described with reference to FIGS. 1 and 2 are omitted herein.

Referring to FIG. 3, the first antenna unit 110 and the second antenna unit 130 may be disposed on different dielectric layers.

For example, the first antenna unit 110 may be disposed on a first dielectric layer 103, and the second antenna unit 130 may be disposed on a second dielectric layer 107. In this case, the first antenna unit 110 and the second antenna unit 130 may be separated or spaced apart from each other with the second dielectric layer 107 interposed therebetween.

In some embodiments, the first antenna unit 110 may be disposed on the second dielectric layer 107, and the second antenna unit 130 may be disposed on the first dielectric layer 103. In this case, the first antenna unit 110 and the second antenna unit 130 may be separated or spaced apart from each other with the first dielectric layer 103 interposed therebetween.

Figure 4:
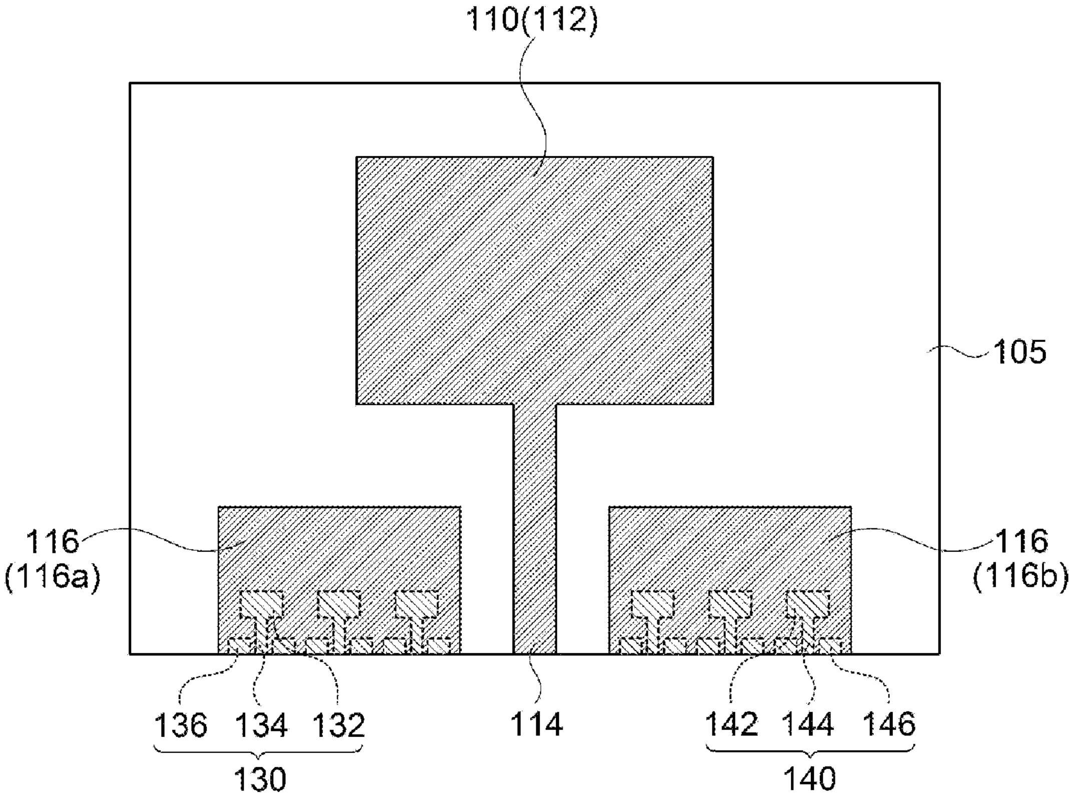
FIG. 4 is a schematic top plan view illustrating an antenna structure in accordance with exemplary embodiments.

FIG. 4 is a schematic top plan view illustrating an antenna structure in accordance with exemplary embodiments.

Referring to FIG. 4, the antenna structure may further include a third antenna unit 140. The third antenna unit 140 may be provided as a high-frequency/ultra-high frequency antenna unit having a higher resonance frequency than that of the first antenna unit 110 together with the second antenna unit 130.

In some embodiments, the third antenna unit 140 may have a higher resonance frequency than that of the second antenna unit 130. For example, the second antenna unit 130 may have a resonance frequency in a range from 20 GHz to 30 GHz or from 25 GHz to 30 GHz, and the third antenna unit 140 may have a resonance frequency in a range from 30 GHz to 40 GHz or from 35 GHz to 40 GHz.

The third antenna unit 140 may include a third radiator 142, a third transmission line 144 and a third ground pad 146. The third radiator 142 may have, e.g., a polygonal plate shape, and the third transmission line 144 may extend from one side of the third radiator 142. The third transmission line 144 may be connected to the third radiator 142 as a substantially integral member.

The third ground pad 146 may be disposed around the third transmission line 144 to be physically and electrically separated from the third transmission line 144 and the third radiator 142. For example, a pair of the third ground pads 146 may be disposed to be separated with the third transmission line 144 interposed therebetween.

The third radiator 142, the third transmission line 144 and the third ground pad 146 may be disposed at the same layer or at the same level.

In some embodiments, a third signal pad for connecting an external circuit may be connected to an end portion of the third transmission line 144. In an embodiment, the end portion of the third transmission line 144 may be provided as the third signal pad.

As described above, the third antenna unit 140 may have a higher resonance frequency than that of the second antenna unit 130, and may have a smaller size than that of the second antenna unit 130. For example, the third radiator 142 may have a smaller area than that of the second radiator 132.

The second antenna unit 130 and the third antenna unit 140 may overlap different guide patterns 116 in a plan view. For example, the second antenna unit 130 may be covered by the first guide pattern 116*a*, and the third antenna unit 140 may be covered by the second guide pattern 116*b*.

The third radiator 142 may be entirely covered by the second guide pattern 116*b* when projected in the plan view. In an embodiment, the third antenna unit 140 may be entirely covered by the second guide pattern 116*b*. Accordingly, the third antenna unit 140 may serve as a vertical radiation antenna by the second guide pattern 116*b*.

In some embodiments, a plurality of the second antenna units 130 may be independently separated from each other and arranged in a width direction, and may be commonly covered by the first guide pattern 116*a*. Further, a plurality of the third antenna units 140 may be independently separated from each other and arranged in the width direction, and may be commonly covered by the second guide pattern 116*b*.

Figure 5:
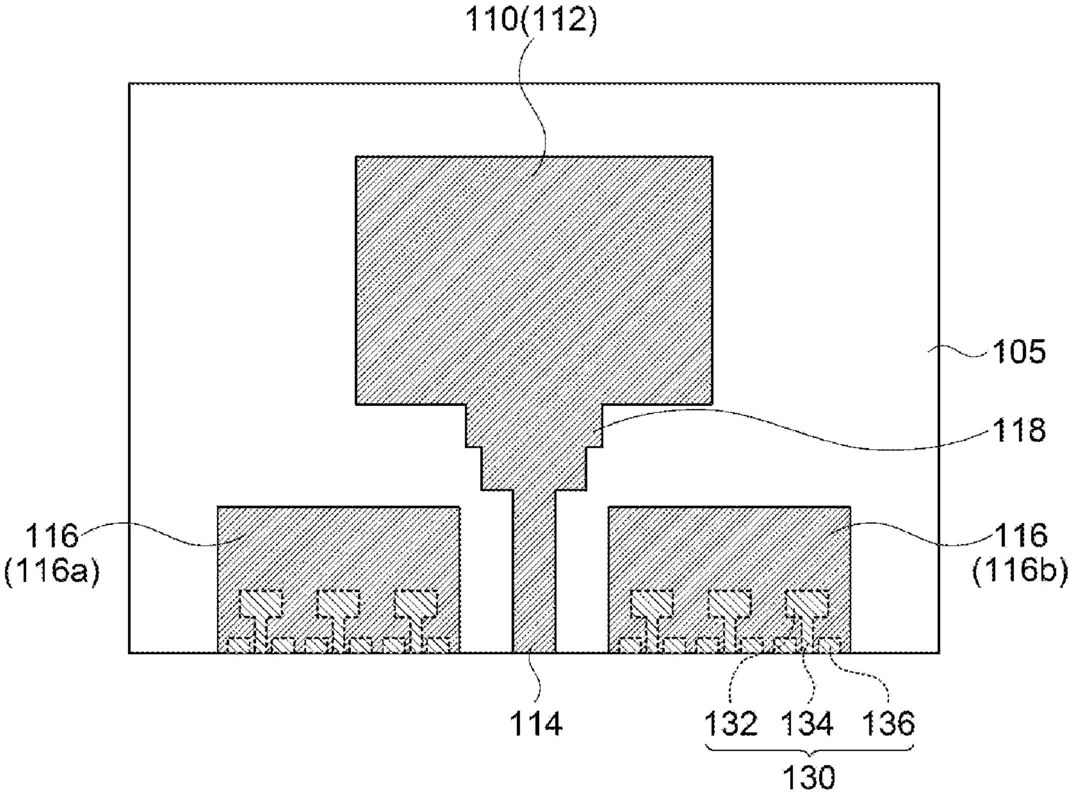
FIGS. 5 and 6 are schematic top plan views illustrating antenna structures in accordance with exemplary embodiments.
Figure 6:
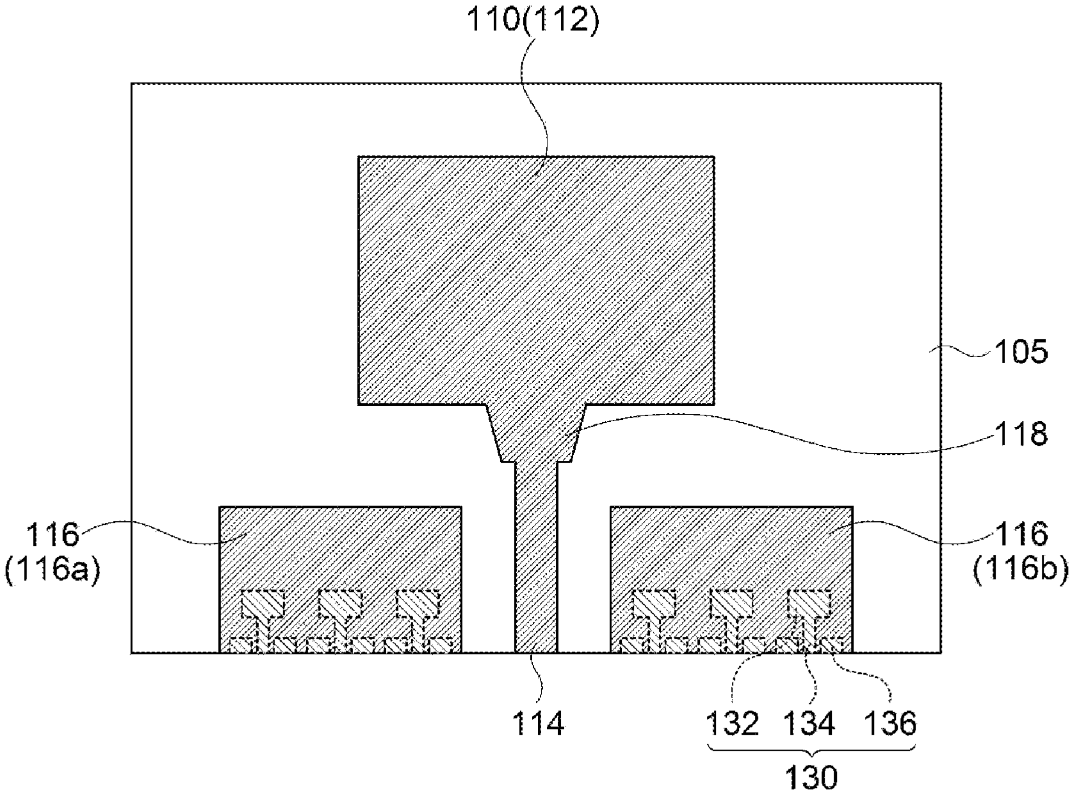

FIGS. 5 and 6 are schematic top plan views illustrating antenna structures in accordance with exemplary embodiments.

Referring to FIGS. 5 and 6, the first antenna unit 110 may further include an intermediate pattern 118. The intermediate pattern 118 may be disposed between the first radiator 112 and the first transmission line 114. For example, the intermediate pattern 118 may be integrally connected to the first radiator 112 and the first transmission line 114.

The intermediate pattern 118 may have a shape in which a width is stepwise or gradually increased in a direction from the first transmission line 114 to the first radiator 112. Accordingly, the intermediate pattern 118 may function as an impedance matching pattern for alleviating or suppressing impedance disturbance caused by a sudden change of a size or a width between the first transmission line 114 and the first radiator 112.

As illustrated in FIG. 5, the intermediate pattern 118 may have a stepped structure. As illustrated in FIG. 6, the intermediate pattern 118 may have a shape in which the width gradually increases in the direction to the first radiator 112 such as a trapezoidal shape.

In an embodiment, a lateral side of the intermediate pattern 118 may have a curved shape such that the width gradually increases in the direction to the first radiator 112.

Figure 7:
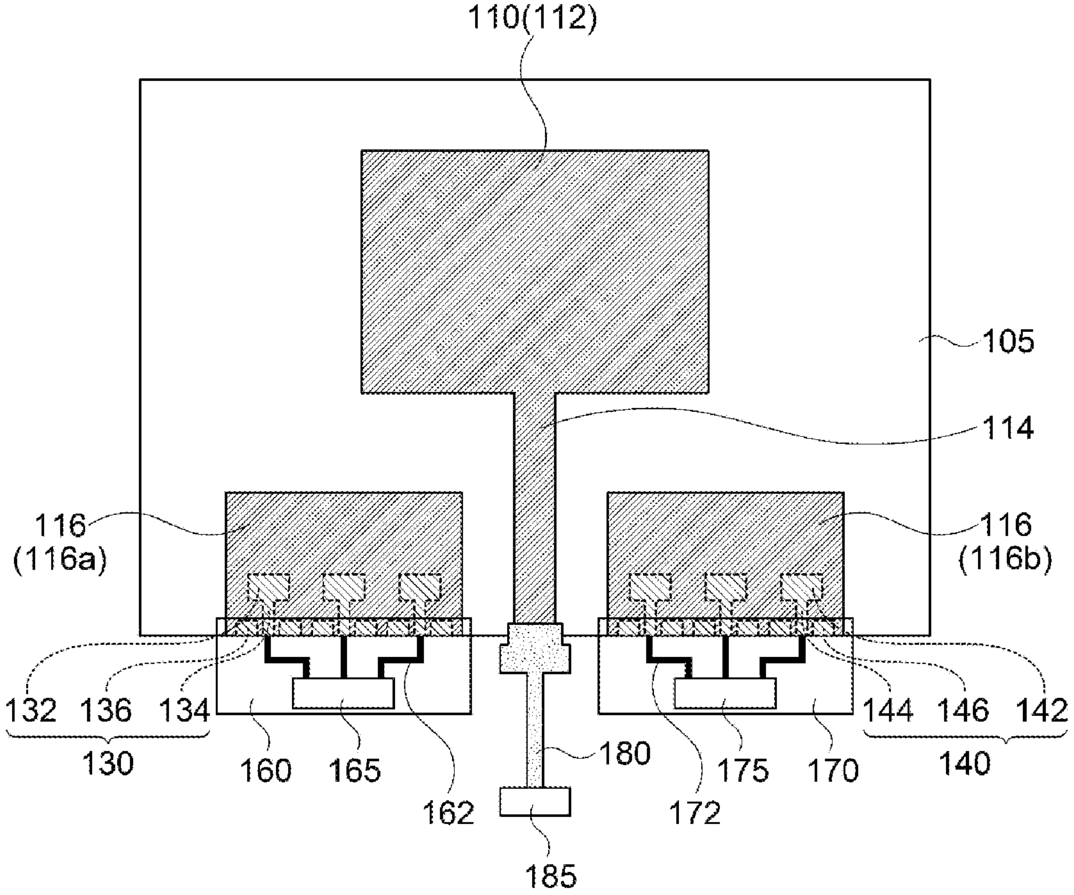
FIG. 7 is a schematic top plan view illustrating an antenna structure in accordance with exemplary embodiments.

FIG. 7 is a schematic top plan view illustrating an antenna structure in accordance with exemplary embodiments.

Referring to FIG. 7, the antenna structure may further include a circuit structure for transmitting a power and a control signal to the antenna units 110, 130 and 140.

In exemplary embodiments, the circuit structure may include a first circuit board 160 and a second circuit board 170. For example, the first circuit board 160 and the second circuit board 170 may be flexible printed circuit boards (FPCBs).

The second antenna unit 130 and a second antenna driving integrated circuit chip 165 that may transmit the power and the control signal to the second antenna unit 130 may be electrically connected to each other through the first circuit board 160.

The first circuit board 160 may include a first signal wiring 162. For example, a plurality of the first signal wirings 162 may be connected to each of the second transmission line 134 of the second antenna unit 130.

For example, an anisotropic conductive film (ACF) may be disposed on an terminal end (or the second signal pad) of the second transmission line 134 and the second ground pad 136 of the second antenna unit 130, and the first circuit board 160 may be pressed onto the anisotropic conductive film to implement an electrical connection between the first circuit board 160 and the second antenna unit 130.

The second antenna driving integrated circuit chip 165 may be mounted on the first circuit board 160. In some embodiments, the second antenna driving integrated circuit chip 165 may be mounted on an intermediate circuit board such as a rigid printed circuit board, and the intermediate circuit board may be coupled to the first circuit board 160 via, e.g., a connector.

The second circuit board 170 may electrically connect the third antenna unit 140 and an second antenna driving integrated circuit chip 175 with each other. The second circuit board 170 may include a second signal wiring 172. The second circuit board 170 may implement an electrical connection between the third antenna unit 140 and the second antenna driving integrated circuit chip 175 in substantially the same or similar manner as that in the above-described first circuit board 160.

In some embodiments, the first antenna unit 110 may be connected to a first antenna driving integrated circuit chip 185 through an antenna cable 180. As described above, the first antenna unit 110 having a relatively low frequency property may have a small signal loss, and thus may be easily connected to the driving integrated circuit using the antenna cable.

The signal loss may be relatively easily caused in the second antenna unit 130 and the third antenna unit 140 serving as the high-frequency/ultrahigh-frequency antenna unit. Accordingly, a signal path may be shortened by employing the circuit boards 160 and 170 to prevent or reduce the signal loss.

The above-described antenna structure may be applied to various structures and objects such as a building, a window, a vehicle, a decorative sculpture and guide signs (e.g., a direction signs, an emergency exit sign, an emergency light), and may be provided as, e.g., a relay antenna structure.

Figure 8:
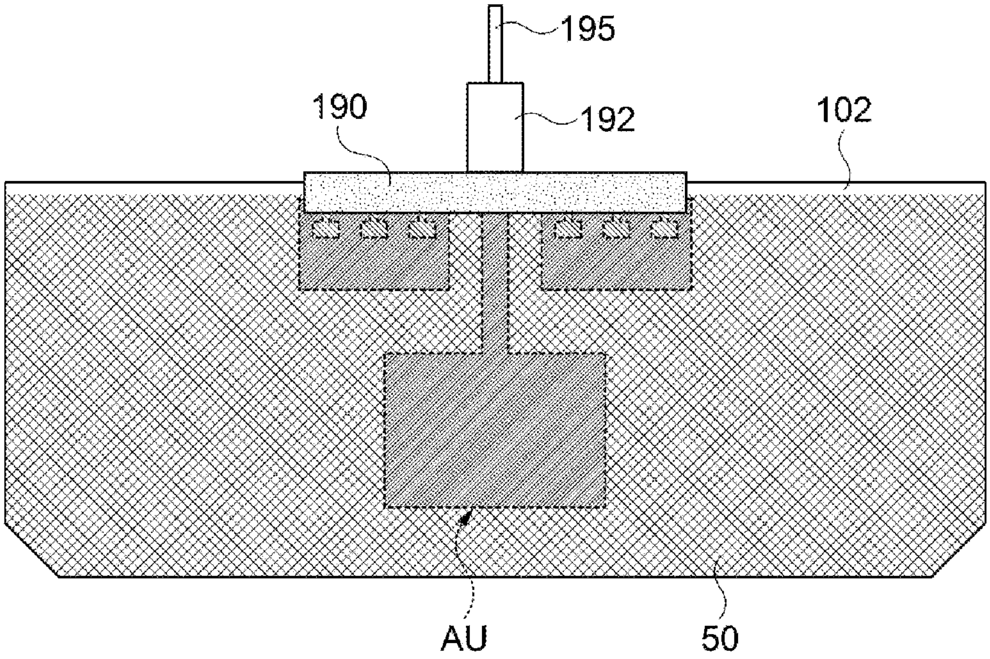
FIG. 8 is a schematic view illustrating an antenna structure in accordance with exemplary embodiments.

FIG. 8 is a schematic view illustrating an antenna structure in accordance with exemplary embodiments. For example, FIG. 8 illustrates an antenna structure provided as a relay antenna structure.

Referring to FIG. 8, the antenna structure may have a structure capable of being fixed to a building structure such as a wall or a ceiling. For example, as described with reference to FIG. 1, the antenna unit AU in which the above-described first and second antenna units are combined may be inserted or attached to a substrate 102.

For example, the substrate 102 may serve as the dielectric layer 105 illustrated in FIG. 1. The substrate 102 may be provided as various decorative structures, an indicator sign, etc.

A first fixing component 190 may be coupled to one side of the substrate 102 to be coupled to the transmission line 140. The first fixing component 190 may have, e.g., a clamp shape. A second fixing component 192 may be inserted into the wall or ceiling and included in the antenna structure such that the antenna structure may be rotatably fixed. For example, the second fixing component 192 may have a screw shape.

An antenna cable 195 may be inserted into the second fixing component 192 and the first fixing component 190 to supply a power to the transmission line 114 of the antenna unit 110.

The antenna cable 195 may be embedded in, e.g., an inner wall of a building and coupled to an external power source, an integrated circuit chip or an integrated circuit board. Accordingly, the power may be supplied to the first antenna unit 110 included in the antenna unit AU to perform an antenna radiation.

For example, the circuit board electrically connected to the second antenna unit 130 may be integrated or embedded in the first fixing component 190, or may be embedded or attached to the substrate 102.

In some embodiments, a dummy mesh pattern 50 may be arranged around the antenna unit AU. The dummy mesh pattern 50 may include substantially the same conductive material as that of the antenna unit AU. An optical environment around the antenna unit AU may become uniform by the dummy mesh pattern 50, and thus a conductive pattern of the antenna structure may be prevented from being visually recognized.

In some embodiments, the antenna unit AU may also include a mesh structure.

What is claimed is:

1. An antenna structure comprising:

a first antenna unit comprising a first radiator and a first transmission line connected to the first radiator;

a guide pattern separated from the first transmission line;

a second antenna unit entirely covered by the guide pattern in a plan view; and a dielectric layer interposed between the first antenna unit and the second antenna unit, wherein the guide pattern comprises a first guide pattern and a second guide pattern separated from each other with the first transmission line interposed therebetween, wherein a plurality of the second antenna units are covered by the guide pattern in the plan view, wherein each of the plurality of the second antenna units comprises a second radiator and a second transmission line connected to the second radiator.

2. The antenna structure of claim 1, wherein a resonance frequency of each of the plurality of the second antenna units is greater than a resonance frequency of the first antenna unit.

3. The antenna structure of claim 1, wherein an area of the second radiator included in each of the plurality of the second antenna units is smaller than an area of the first radiator.

4. The antenna structure of claim 1, wherein the dielectric layer comprises a first dielectric layer and a second dielectric layer spaced apart from each other, and the first antenna unit is disposed on the first dielectric layer, and the second antenna unit is disposed on the second dielectric layer.

5. The antenna structure of claim 1, wherein the first antenna unit further comprises an intermediate pattern disposed between the first radiator and the first transmission line, and a width of the intermediate pattern increases stepwise or gradually in a direction from the first transmission line to the first radiator.

6. The antenna structure of claim 1, further comprising:
an antenna cable coupled to the first transmission line; and
a first antenna driving integrated circuit chip electrically connected to the first antenna unit through the antenna cable.

7. The antenna structure of claim 1, further comprising:
a circuit board bonded on the second antenna unit; and
a second antenna driving integrated circuit chip electrically connected to the second antenna unit through the circuit board.

8. An antenna structure, comprising:
a first antenna unit comprising a first radiator and a first transmission line connected to the first radiator;
a guide pattern separated from the first transmission line;
a second antenna unit entirely covered by the guide pattern in a plan view;
a dielectric layer interposed between the first antenna unit and the second antenna unit; and
a third antenna unit,
wherein the guide pattern comprises a first guide pattern and a second guide pattern separated from each other with the first transmission line interposed therebetween,
wherein the second antenna unit is superimposed over the first guide pattern in the plan view, and the third antenna unit is superimposed over the second guide pattern in the plan view.

9. The antenna structure of claim 8, wherein a resonance frequency of the third antenna unit is greater than a resonance frequency of the second antenna unit, and the resonance frequency of the second antenna unit is greater than a resonance frequency of the first antenna unit.

10. The antenna structure of claim 9, wherein the third antenna unit comprises a third radiator and a third transmission line connected to the third radiator.

11. The antenna structure of claim 10, wherein the third radiator is entirely covered by the second guide pattern in the plan view.

12. The antenna structure of claim 11, wherein a plurality of the third antenna units are covered by the second guide pattern in the plan view.

13. The antenna structure of claim 9, wherein the resonance frequency of the first antenna unit is 10 GHz or less, and the resonance frequencies of the second antenna unit and the third antenna unit is from 20 GHz to 40 GHz.

* * * * *